US009559470B2

(12) United States Patent
Lee

(10) Patent No.: US 9,559,470 B2
(45) Date of Patent: Jan. 31, 2017

(54) POWER EXTENSION WIRE

(71) Applicant: POWERTECH INDUSTRIAL CO., LTD., New Taipei (TW)

(72) Inventor: Yu-Lung Lee, New Taipei (TW)

(73) Assignee: POWERTECH INDUSTRIAL CO., LTD., New Taipei (TW)

( * ) Notice: Subject to any disclaimer, the term of this patent is extended or adjusted under 35 U.S.C. 154(b) by 0 days.

(21) Appl. No.: 14/876,875

(22) Filed: Oct. 7, 2015

(65) Prior Publication Data

US 2016/0104988 A1 Apr. 14, 2016

(30) Foreign Application Priority Data

Oct. 9, 2014 (TW) ............................ 103135222 A

(51) Int. Cl.
*H02J 1/00* (2006.01)
*H01R 13/66* (2006.01)
*H01R 25/00* (2006.01)

(52) U.S. Cl.
CPC ...... *H01R 13/6691* (2013.01); *H01R 13/6675* (2013.01); *H01R 25/003* (2013.01); *H01R 13/665* (2013.01)

(58) Field of Classification Search
CPC ............ H01R 13/6691; H01R 13/6675; H01R 25/003; H01R 13/665
USPC ........................................................... 307/11
See application file for complete search history.

(56) References Cited

U.S. PATENT DOCUMENTS

2007/0141894 A1* 6/2007 McGinley .......... H01R 13/6658 439/447
2007/0164704 A1* 7/2007 McGinley .......... H01R 13/6658 320/114
2014/0180486 A1* 6/2014 Newman, Jr. ........... G06F 1/325 700/295
2015/0311649 A1* 10/2015 Horne .................. H01R 13/641 439/489

* cited by examiner

*Primary Examiner* — Daniel Cavallari
(74) *Attorney, Agent, or Firm* — Li & Cai Intelletual Property (USA) Office

(57) ABSTRACT

A power extension wire includes a power plug, a socket, and a cord connected between the power plug and the socket. The power plug includes a wireless transmission module, the socket includes an alternating-current jack and a current converting unit. The cord includes a plurality of alternating-current conducting wires and at least one direct-current conducting wire. The current converting unit receives an alternating-current power through the alternating-current conducting wires and provides a direct-current power to the wireless transmission module through the direct-current conducting wire.

5 Claims, 6 Drawing Sheets

POWER EXTENSION WIRE

BACKGROUND

1. Technical Field

The instant disclosure relates to a power extension wire, in particular, to a power extension wire adapted to receive alternating-current power.

2. Description of Related Art

The type of electric devices increases by day, and since each of the electric devices has a power plug to enable electric power conduction, the number of the sockets in the houses of the user is not enough. Therefore, it is common to use power extension wires for increasing the number of the sockets.

The most common power extension wire is a bar-shape socket with more than three sets of alternating-current jacks positioned thereon. One side of the socket has a cord and a power plug for inserting and connecting to the external power source. Therefore, it is able to increase the number of the sockets for more electric devices.

SUMMARY

An exemplary embodiment of the instant disclosure provides a power extension wire, the power extension wire comprises a power plug, an electric element and a cord connected between the power plug and the electric element. The power plug has a wireless transmission module, and the electric element has at least one current converting unit. The cord has a plurality of alternating-current conducting wires and at least one direct-current conducting wire. The current converting unit receives an alternating-current power through the plurality of alternating-current conducting wires, and the current converting unit supplies power to the wireless transmission module through the at least one direct-current conducting wire. The electric element may be a socket or household electrical appliances such as an oven, a fan, a refrigerator, a television, etc.

An exemplary embodiment of the instant disclosure provides a power extension wire, the power extension wire comprises a power plug, a socket and a cord connected between the power plug and the socket. The power plug has a wireless transmission module, and the socket has at least one alternating-current jack and a current converting unit. The cord has a plurality of alternating-current conducting wires and at least one direct-current conducting wire. The current converting unit receives an alternating-current power through the plurality of alternating-current conducting wire, and the current converting unit provides power to the wireless transmission module through the at least one direct-current conducting wire.

The exemplary embodiment of the instant disclosure provides a power extension wire, the power extension wire comprises a power plug, an electric element and a cord connected between the power plug and the electric element. The power plug has a first temperature sensor element, and the electric element comprises at least one current converting unit. The cord has a plurality of alternating-current conducting wires and at least one transmitting wire; the transmitting wire may be a direct-current conducting wire or a signal transmitting wire. When a temperature sensed by the first temperature sensitive element is higher than a first threshold value, the first temperature sensor element transmits a first sense signal to the electric element through the at least one direct-current conducting wire.

The exemplary embodiment of the instant disclosure further provides a power extension wire, the power extension wire comprises a power plug, a socket and a cored connected between the power plug and the socket. The power plug has a first temperature sensor element, and the socket has an alternating-current jack. The cord has a plurality of alternating-current conducting wires and at least one direct-current conducting wire. When a temperature sensed by the first temperature sensitive element is higher than a first threshold value, the first temperature sensor element transmits a first sense signal to the socket through the at least one direct-current conducting wire.

In order to further understand the techniques, means and effects of the instant disclosure, the following detailed descriptions and appended drawings are hereby referred, such that, through which, the purposes, features and aspects of the instant disclosure can be thoroughly and concretely appreciated; however, the appended drawings are merely provided for reference and illustration, without any intention to be used for limiting the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the instant disclosure.

DESCRIPTION OF THE EXEMPLARY EMBODIMENTS

Figure 1A:
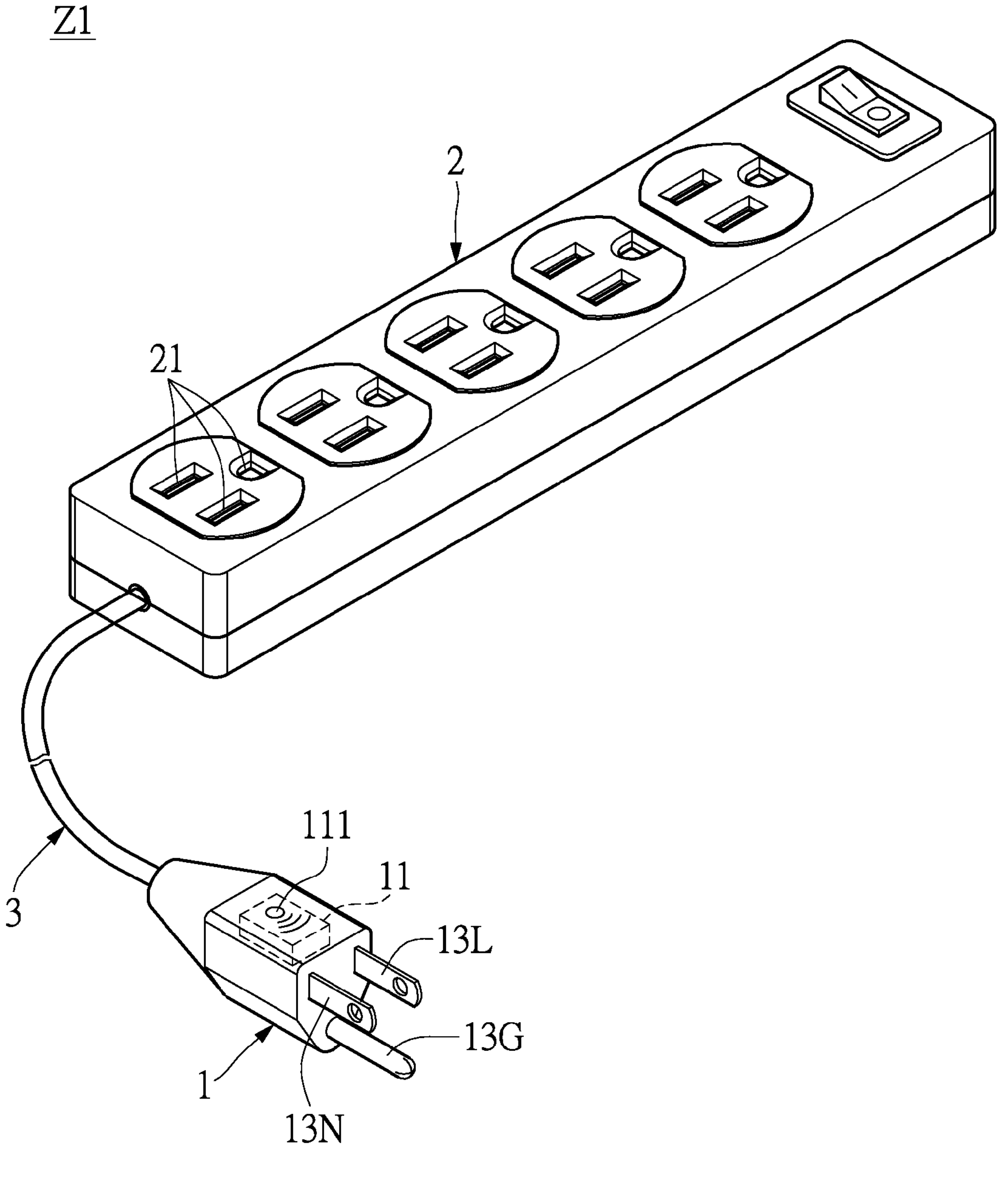
FIG. 1A is an external schematic view of a power extension wire of a first embodiment of the instant disclosure.

Reference will now be made in detail to the exemplary embodiments of the instant disclosure, examples of which are illustrated in the accompanying drawings. Wherever possible, the same reference numbers are used in the drawings and the description to refer to the same or like parts.

The major feature of the instant disclosure resides in that the socket has a wireless transmission module or a temperature sensor element, and is connected with the electric element behind through the cord. The electric element may be a socket or household electrical appliances such as an oven, a fan, a refrigerator, a television, etc. However, the instant disclosure is not limited thereto.

First Embodiment

Figure 1B:
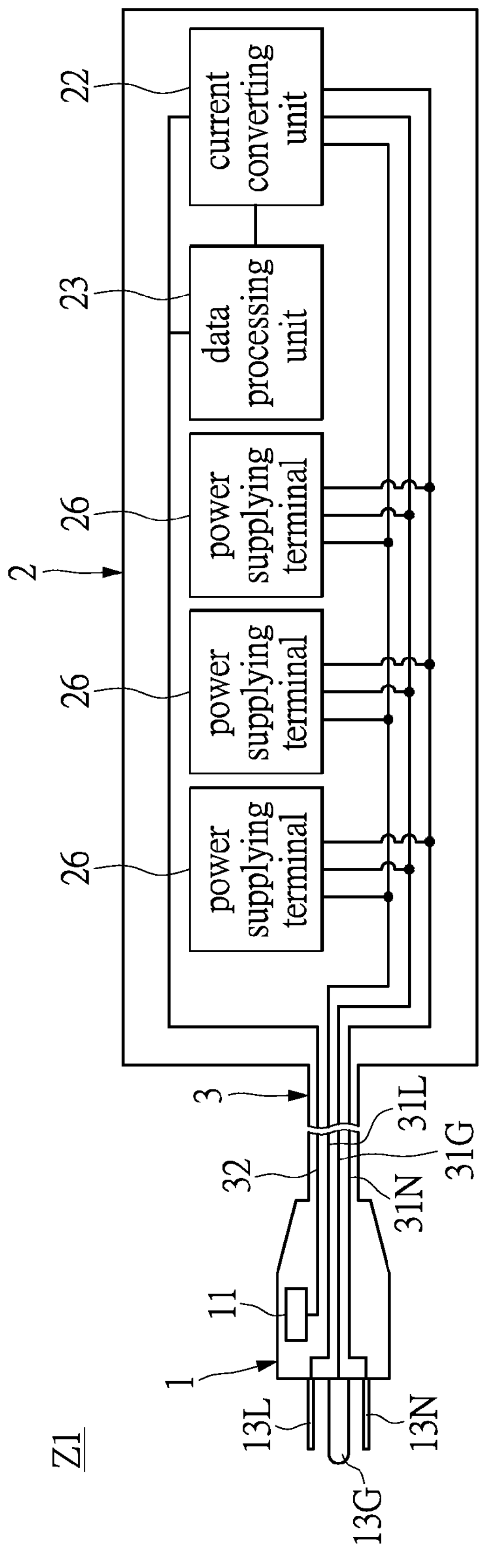
FIG. 1B is a schematic view of the circuit of the power extension wire of the first embodiment of the instant disclosure.
Figure 1C:
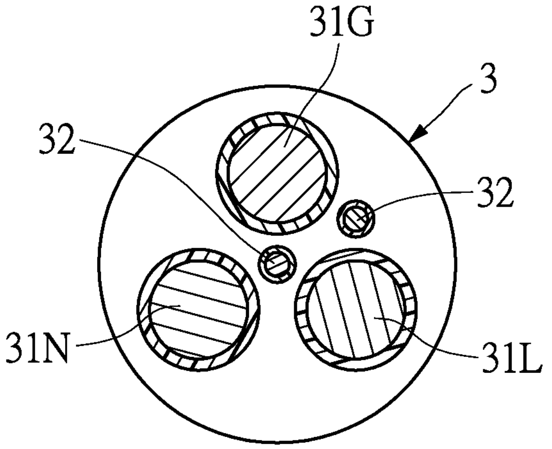
FIG. 1C is a sectional view of a cord of the power extension wire of the first embodiment of the instant disclosure.

Please refer to FIGS. 1A, 1B and 1C. In the present embodiment, the electric element is a socket. However, the instant disclosure is not limited thereto. FIG. 1A is an external schematic view of the power extension wire of a first embodiment of the instant disclosure. FIG. 1B is a schematic view of the circuit of the power extension wire of the first embodiment of the instant disclosure. FIG. 1C is a sectional view of the cord of the power extension wire of the first embodiment of the instant disclosure. The embodiment of the instant disclosure provides a power extension wire Z1 adapted to receive alternating-current power, the power extension wire Z1 comprises a power plug 1, a socket 2 and a cord 3 connected between the power plug 1 and the socket 2, wherein the power plug 1 has a wireless transmission module 11 positioned therein, and the socket 2 has a current converting unit 22 positioned therein. Furthermore, the cord 3 has a plurality of alternating-current conducting wires 31L, 31N, 31G, and at least one direct-current conducting wire 32. The power converting unit 22 receives alternating-current power through the alternating-current conducting wires 31L, 31N, 31G, and provides electric power to the wireless transmission module 11 in the power plug 1 through the direct-current conducting wire 32. Therefore, the power extension wire Z1 may receive and transmit data through the wireless transmission module 11.

As shown in the figure, the power plug 1 is connected to one end of the cord 3, and has at least two power pins 13L, 13N, 13G. For instance, in the embodiment shown in the figures, the number of the power pins 13L, 13N, 13G is three, and are positive fire pin, neutral pin and ground pin respectively. These power pins 13L, 13N, 13G may be used for removably inserting and connecting to an external socket which supplies alternating-current, such as a wall type socket (not shown) for receiving alternating-current. In other embodiments that are not shown in figures, the power plug may be a China standard power plug with two flat pins, or a U.S.A or Australia standard power plug with two flat pins, and these power pins may be design according to the standards in each area of the world.

The power plug 1 has a wireless transmission module 11 positioned therein. For instance, the wireless transmission module 11 may comprises an antenna 111, and the data received or transmitted by the wireless transmission module 11 is transferred between the wireless transmission module 11 and an external signal source outside of the power extension wire Z1 in the form of wireless electric wave. In another embodiment, the data received or transmitted by the wireless transmission module 11 may be transferred in a small range in a wireless PAN. For example, the wireless transmission module 11 may comprise a Bluetooth emitting device, and the data received or transmitted by the wireless transmission module 11 is transferred in the form of Bluetooth wireless signal.

As shown in the figure, the socket 2 is attached to the other end of the cord 3 and has a current converting unit 22 and at least one set of alternating-current jack 21. Each set of the alternating-current jack 21 comprises at least two alternating-current jacks 21, and each set of the alternating-current jack 21 corresponds to the power supplying terminals 26 in the socket 2. Taking the embodiment shown in the figures as an example, each set of the alternating-current jack 21 has three alternating-current jacks 21. The power supplying terminals 26 may electrically connected to three power input wires (not shown) in the socket 2, and electrically connected to the power plug 1 through the alternating-current conducting wires 31L, 31N, 31G in the cord 3 for receiving alternating-current. Each set of the alternating-current jacks 21 is used as an interface for transferring electrical power. To be specific, when supplying electrical power to the alternating-current jacks 21, the power plug external to the power extension wire Z1 (such as the power plug of the electric appliance) may be inserted to the alternating-current jacks 21 to access alternating-current.

The current converting unit 22 is used for converting alternating-current into direct-current. It is worthwhile to mention that the current converting unit 22 receives electrical power through the alternating-current conducting wires 31L, 31N, 31G in the cord 3, and the current converting unit 22 supplies electrical power to the wireless transmission module 11 of the power plug 1 through the direct-current conducting wire 32 in the cord 3. Furthermore, taking the present embodiment as an example, the socket 2 further comprises a data processing unit 23 positioned therein, the data processing unit 23 may receive and transmit data through the wireless transmission module 11 of the power plug 11. To be specific, the data received and transmitted by the wireless transmission module 11 is transferring between the wireless transmission module 11 of the power plug 1 and the data processing unit 23 of the socket 2 through the direct-current conducting wire 32 in the cord 3.

As shown in FIGS. 1B and 1C, cord 3 comprises three alternating-current conducting wires 31L, 31N, 31G that are fire line, neutral line and ground line respectively, and the cord 3 further comprises two direct-current conducting wires 32. The alternating-current conducting wires 31L, 31N, 31G in the cord 3 electrically connected to one of the power pins 13L, 13N, 13G and the two power supplying terminals 26. Besides, the alternating-current conducting wires 31L, 31N, 31G further electrically connect to the current converting unit 22 in the socket 2 to supply electric power to the current converting unit 22.

The direct-current conducting wires 32 in the cord 3 connect to the wireless transmission module 11 in the power plug 1 and the current converting unit 22 in the socket 2. The wireless transmission unit 11 receives the direct-current supplied by the current converting unit 22. Furthermore, the direct-current conducting wire 32 electrically connected to the wireless transmission module 11 in the power plug 1 and the current converting unit 22 in the socket 2 respectively to produce the transferring path of data in the power extension wire Z1.

Each of the alternating-current conducting wires 31L, 31N, 31G and each of the direct-current conducting wires 32 are insulated by a non-conductive coating to prevent the alternating-current conducting wires 31L, 31N, 31G and the direct-current conducting wires 32 contact with the adjacent alternating-current conducting wires 31L, 31N, 31G and the direct-current conducting wires 32, thereby avoiding the generation of a short circuit. Furthermore, the alternating-current conducting wires 31L, 31N, 31G and the direct-current conducting wires 32 may be coated by the same insulation layer, thereby forming the cord 3. It is noted that as shown in FIG. 1C, the direct-current conducting wires 32 is positioned in the gaps between the alternating-current conducting wires 31L, 31N, 31G, and the wire diameter of the direct-current conducting wires 32 is smaller than each of the wire diameter of the alternating-current conducting wires 31L, 31N, 31G Therefore, the space for arranging the direct-current conducting wires 32 is reduced by using the gaps between the alternating-current conducting wires 31L, 31N, 31G Accordingly, the size (sectional area) of the cord formed thereby may be reduced.

In general, the external socket supplying alternating-current (such as a wall-type socket) may be disposed on the wall of a room, and has a height relative to the ground. Therefore, when using the power extension wire Z1, the power plug 1 inserted into the wall-type socket has a height relative to the ground. In other words, the wireless transmission module 11 of the power plug 1 may has a height relative to the ground and thereby preventing the transmission of the wireless signal being affect by the furniture or electric appliances in the room and ensuring the quality of the receiving and transmittance of the data. Besides, the user may disposed the socket 2 of the power extension wire Z1 according to the actual needs, for example, the user may place the socket 2 on the ground without considering that the arrangement of the socket would affect the signal of the wireless transmission module 11.

Besides, the current converting unit 22 is positioned on the socket 2, and the wireless transmission module 11 may receive the direct-current supplied by the current converting unit 22 through the direct-current conducting wires 32 in the cord 3. The data processing unit 23 is positioned on the socket 2 as well, and the wireless transmission module 11 may receive the data transmitted by the data processing unit 23 through the direct-current conducting wires 32 in the cord 3 or transmit data to the data processing unit 23. Therefore, the size of the power plug 1 only has to accommodate with the size of the wireless transmission module 11. Accordingly, the size of the power plug 1 may be reduced. Moreover, by positioned both of the current converting unit 22 and the data processing unit 23 on the socket 2, it is able to avoid the receiving and transmittance of the signal of the wireless transmission module 11 interfere by other electronic elements. According to different design needs, the designer may achieve good receiving and transmittance efficiency by adjusting the position of the antenna 111 on the power plug 1.

Second Embodiment

Figure 2:
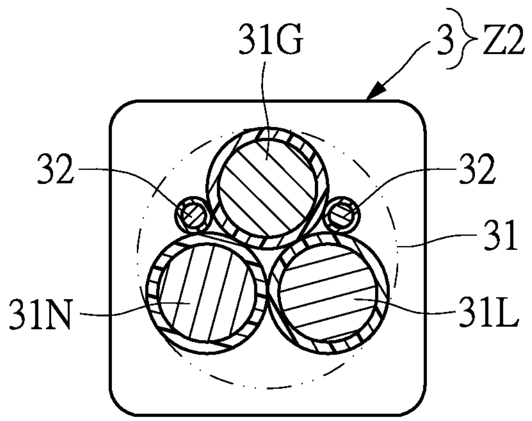
FIG. 2 is a sectional view of a cord of the power extension wire of a second embodiment of the instant disclosure.

Please refer to FIG. 2. FIG. 2 is a sectional view of the cord of the power extension wire of a second embodiment of the instant disclosure. In this embodiment, the electric element is a socket; however, the instant disclosure is not limited thereto. This embodiment is similar to the previous embodiment, the difference between the present embodiment and the first embodiment will be discussed in detail below.

In the present embodiment, the cord connected between the power plug and the electric element (i.e., the socket) has at least one transmitting wire which may be a direct-current conducting wire or a signal transmitting wire. In the following description, the transmitting wire is a direct-current conducting wire 32. The wire diameter of the direct-current conducting wire 32 is smaller than each of the wire diameter of the alternating-current conducting wires 31L, 31N, 31G. Besides, the alternating-current conducting wires 31L, 31N, 31G are arranged as a bundle of conducting wire 31. Therefore, the arrangement of the alternating-current conducting wires 31L, 31N, 31G may save some spaces. Besides, the axle center of the direct-current conducting wire 32 is arranged inside of the outer diameter of the bundle of conducting wire 31. Therefore, the arrangement of the direct-current conducting wire 32 may sufficiently use the gaps between the alternating-current conducting wires 31L, 31N, 31G, thereby saving spaces.

Third Embodiment

Figure 3A:
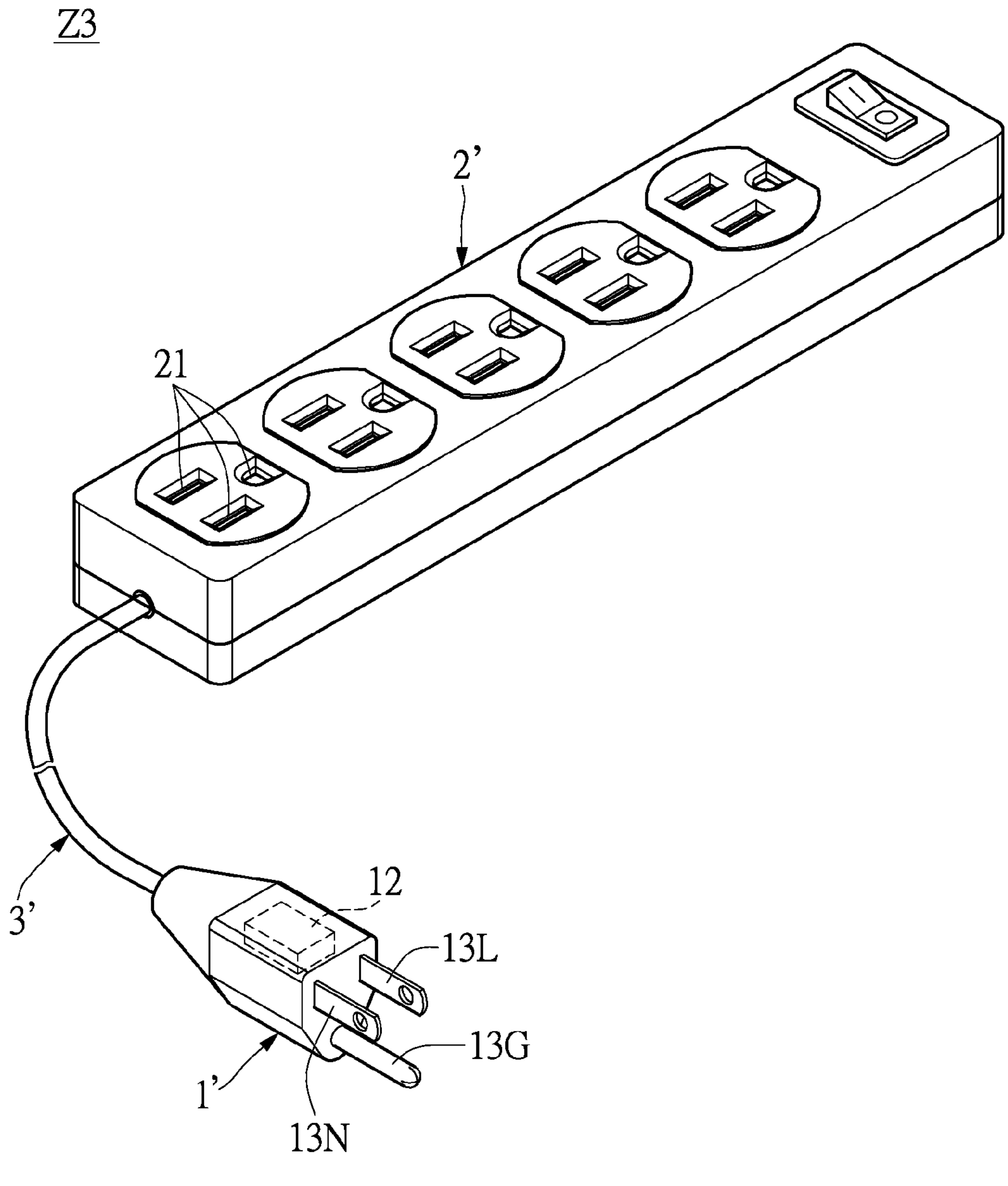
FIG. 3A is an external schematic view of a power extension wire of a third embodiment of the instant disclosure.
Figure 3B:
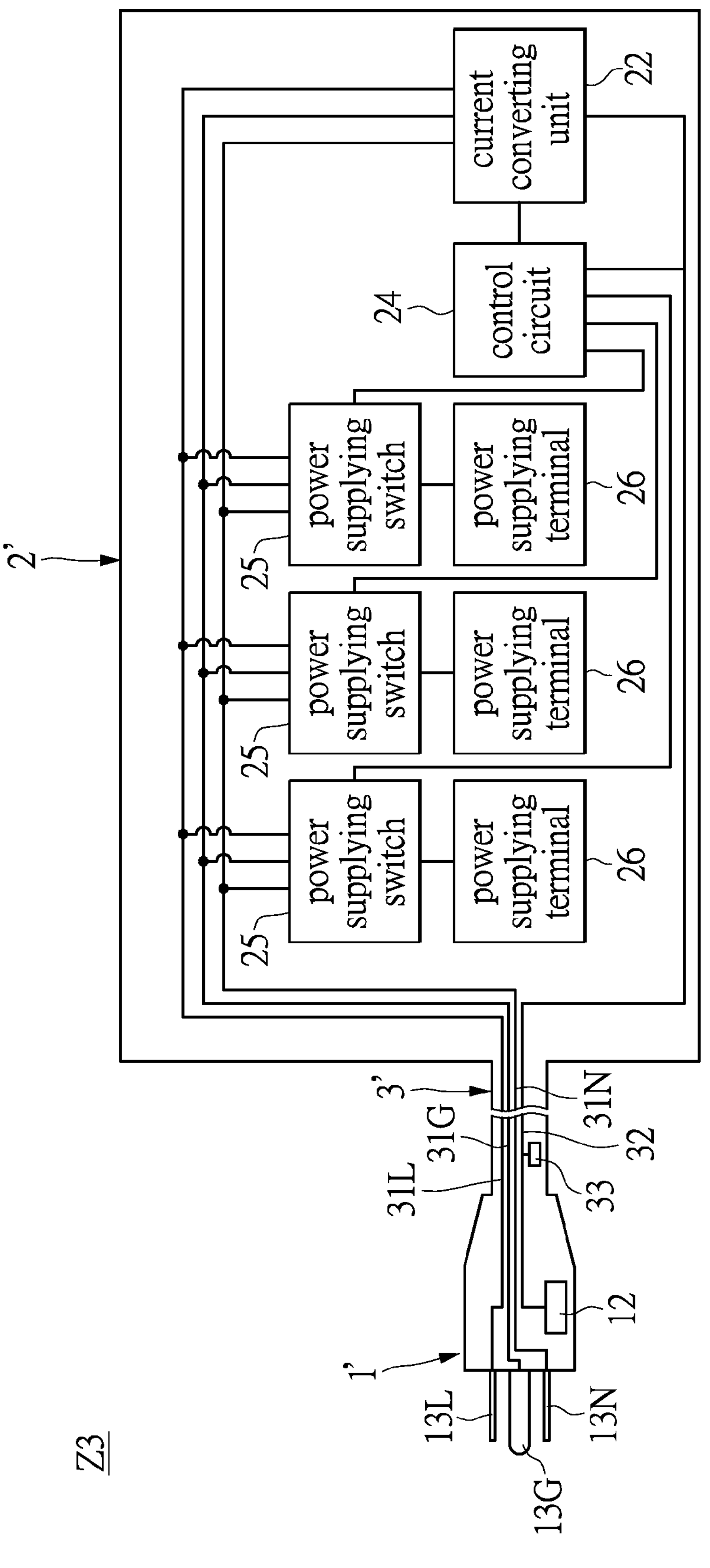
FIG. 3B is a schematic view of a circuit of the power extension wire of the third embodiment of the instant disclosure.
Figure 3C:
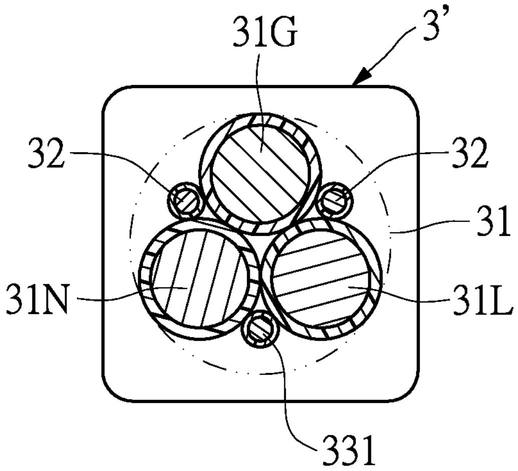
FIG. 3C is sectional view of a cord of the power extension wire of the third embodiment of the instant disclosure.

Please refer to FIG. 3A, FIG. 3B and FIG. 3C. FIG. 3A is an external schematic view of the power extension wire of a third embodiment of the instant disclosure. FIG. 3B is a schematic view of the circuit of the power extension wire of the third embodiment of the instant disclosure. FIG. 3C is sectional view of the cord of the power extension wire of the third embodiment of the instant disclosure. The present embodiment is similar to the first embodiment, the difference between the present embodiment and the first embodiment will be discussed in detail below. The present embodiment provides a power extension wire Z3 for receiving alternating-current, the power extension wire Z3 comprises a power plug 1', a socket 2' and a cord 3' connected between the power plug 1' and the socket 2', wherein the power plug 1' has a first temperature sensor element 12. Furthermore, the cord 3' has a plurality of alternating-current conducting wires 31L, 31N, 31G and at least one direct-current wire 32. When the temperature sensed by the first temperature sensor element 12 is higher than a first threshold value, the first temperature sensor element 12 transmits a first sense signal to the socket 2' through the direct-current conducting wire 32. Therefore, the socket 2' may cut-off or display a warning signal according to the first sense signal, thereby preventing the power plug 1' of the power extension wire Z3 from damaging or inducing accidents due to overheat.

As shown in the figure, the first temperature sensor element 12 may be positioned inside of the power plug 1'. The first temperature sensor element 12 may have a temperature sensor pin (not shown) for sensing the temperature of the power plug 1'. The temperature sensor element 12 may have a temperature signal processing circuit (not shown). When the temperature sensed by the first temperature sensor element 12 is higher than the first threshold value, the first temperature sensor element 12 produces a first sense signal through the signal processing circuit, and transmits the first sensor signal to the socket 2' through the direct-current conducting wire 32 in the cord 3', thereby inducing the socket 2' to cut-off or display a warning signal according to the first sense signal. When the temperature sensed by the first temperature sensor element 12 is lower than the first threshold value, the first temperature sensor element 12 may transmit another sense signal to the socket 2' through the direct-current conducting wire 32 in the cord 3', thereby inducing the socket 2' to supply electrical power.

Taking a modified embodiment shown in the figure as an example, the cord 3' may has a second temperature sensor element 33 for sensing the temperature of the cord 3'. For example, the second temperature sensor element 33 may have a temperature sensing wire 331 for sensing the temperature of the cord 3'. As shown in FIG. 3C, the temperature sensing wire 331 is positioned in the gaps between the alternating-current conducting wires 31L, 31N, 31G for sensing the temperature of the cord 3'. In addition, the wire diameter of the temperature sensing wire 331 may be smaller than the wire diameter of each of the alternating-current conducting wires 31L, 31N, 31G Therefore, the arrangement of the temperature sensing wire 331 may utilize the gaps between the alternating-current conducting wires 31L, 31N, 31G, thereby saving spaces. Accordingly, the size (sectional area) of the cord 3' may be reduced.

When the temperature sensed by the second temperature sensor element 33 is larger than a second threshold value, the second temperature sensor element 33 transmits a second sense signal to the socket 2' through the direct-current conducting wire 32 in the cord 3', thereby inducing the socket 2' to cut-off or display a warning signal according to the second sense signal. When the temperature sensed by the second temperature sensor element 33 is lower than the second threshold value, the second temperature sensor element 33 may transmit another sense signal to the socket 2' through the direct-current conducting wire 32 in the cord 3', thereby inducing the socket 2' to supply electrical power.

In addition, the socket 2' has a control circuit 24 and a plurality of power supplying switches 25 therein. The control circuit 24 detects the temperature of the power plug 1' and the temperature of the cord 3' through the first temperature sensor element 12 and the second temperature sensor element 33, and the control circuit 24 induces the socket 2' to cut-off or display a warning signal according to the first sense signal and the second sense signal, thereby preventing the power plug 1' or the cord 3' overheat or melt and generating short circuit or fire. To be specific, the power supplying switches 25 are coupled to the control circuit 24 and electrically connected to the alternating-current conducting wires 31L, 31N, 31G and corresponding power supplying terminals 26 separately. The control circuit 24 controls the power supplying switches 25 to be on or off according to the first sense signal and the second sense signal transmitted by the direct-current conducting wires 32, in order to control the power supply of the alternating-current jacks 21.

In summary, in the power extension wire Z3 of the above embodiments, the control circuit 24 is positioned on the socket 2', and the control circuit 24 may receive the sense signals transmitted by the first temperature sensor element 12 and the second temperature sensor element 33 through the direct-current conducting wire 32 of the cord 3'. Therefore, the size of the power plug 1' only have to accommodate with the size of the first temperature sensor element 12, thereby reducing the size of the power plug 1'. Moreover, the power extension wire Z3 of the above embodiment may form two independent temperature-sensing cut-off mechanisms by the first temperature sensor element 12 positioned in the power plug 1' and the second temperature sensor element 33 positioned in the cord 3', thereby effectively increasing the safety of the power extension wire Z3.

The above-mentioned descriptions represent merely the exemplary embodiment of the instant disclosure, without any intention to limit the scope of the instant disclosure thereto. Various equivalent changes, alternations or modifications based on the claims of instant disclosure are all consequently viewed as being embraced by the scope of the instant disclosure.

What is claimed is:

1. A power extension wire, comprising:

a power plug, the power plug has a wireless transmission module;

a socket, the socket has at least one alternating-current jack and a current converting unit; and a cord connected between the power plug and the socket, the cord has a plurality of alternating-current conducting wires and at least one direct-current conducting wire; the current converting unit receives an alternating-current power through the plurality of alternating-current conducting wires, and the current converting unit supplies power to the wireless transmission module through the at least one direct-current conducting wire.

2. The power extension wire according to claim 1, wherein the wireless transmission module comprises an antenna.

3. The power extension wire according to claim 1, wherein the socket has a data processing unit positioned therein, and the data processing unit receives and transmits data through the wireless transmission module.

4. The power extension wire according to claim 1, wherein the at least one direct-current conducting wire is positioned in a gap between the plurality of alternating-current conducting wires.

5. The power extension wire according to claim 1, wherein the at least one direct-current conducting wire has a diameter smaller than a wire diameter of each of the plurality of alternating-current conducting wires, the plurality of alternating-current conducting wires are arranged as a bundle of conducting wire, and at least one of the direct-current conducting wire has an axle center positioned in the outer diameter of the bundle of conducting wire.

* * * * *